June 12, 1962  C. HÖLZER  3,038,361
TURNING MACHINES
Filed Nov. 4, 1958  6 Sheets-Sheet 6
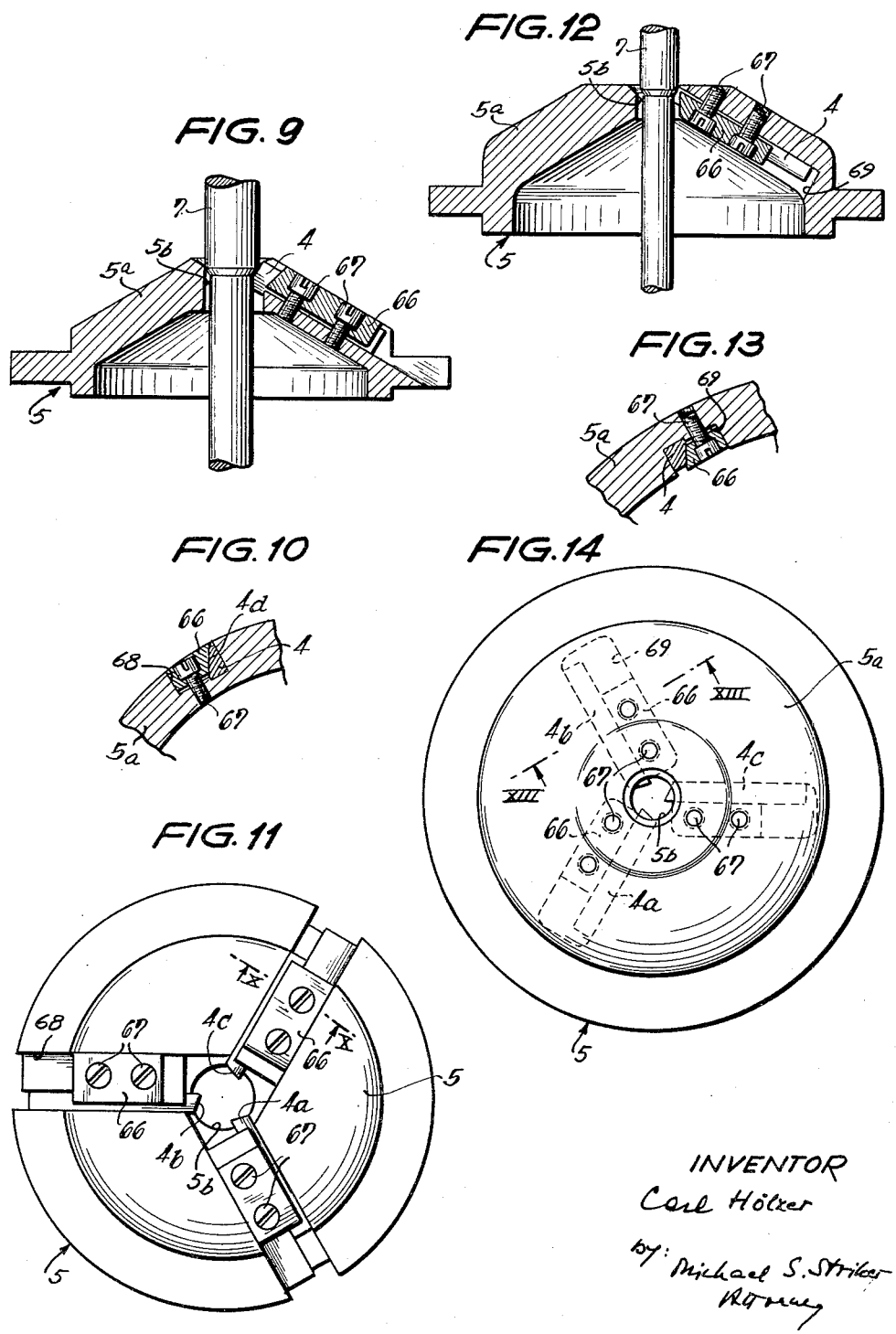
INVENTOR
Carl Hölzer

United States Patent Office 3,038,361
Patented June 12, 1962

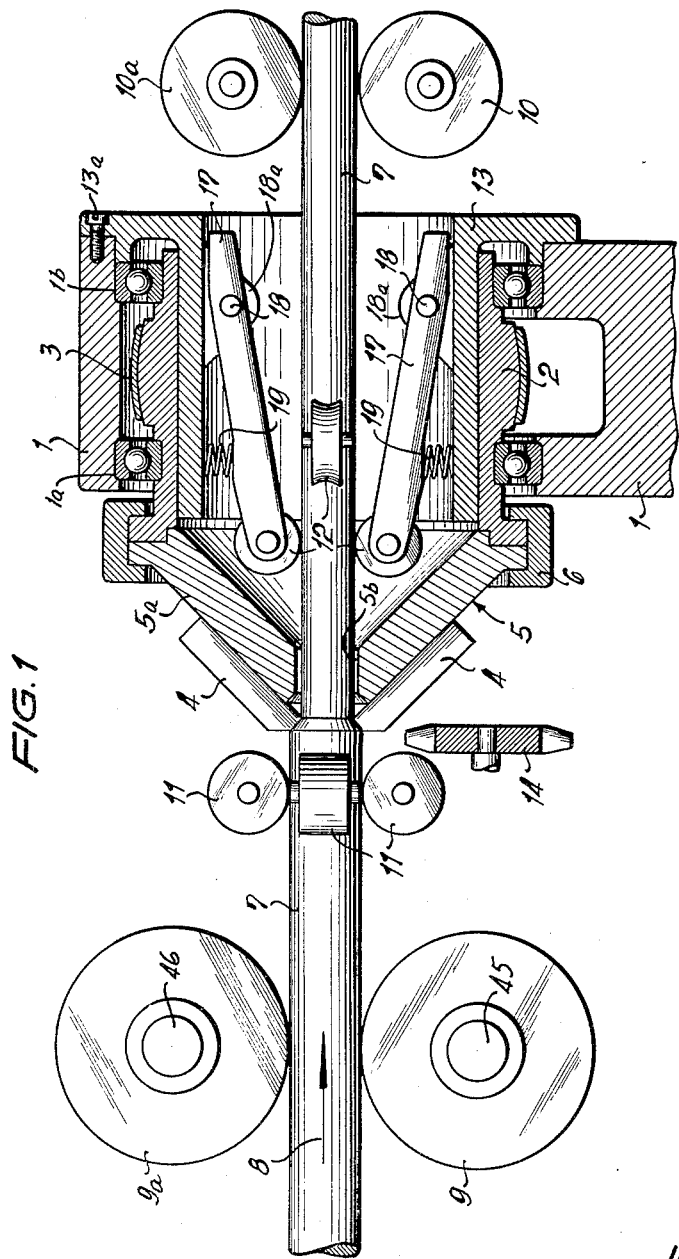

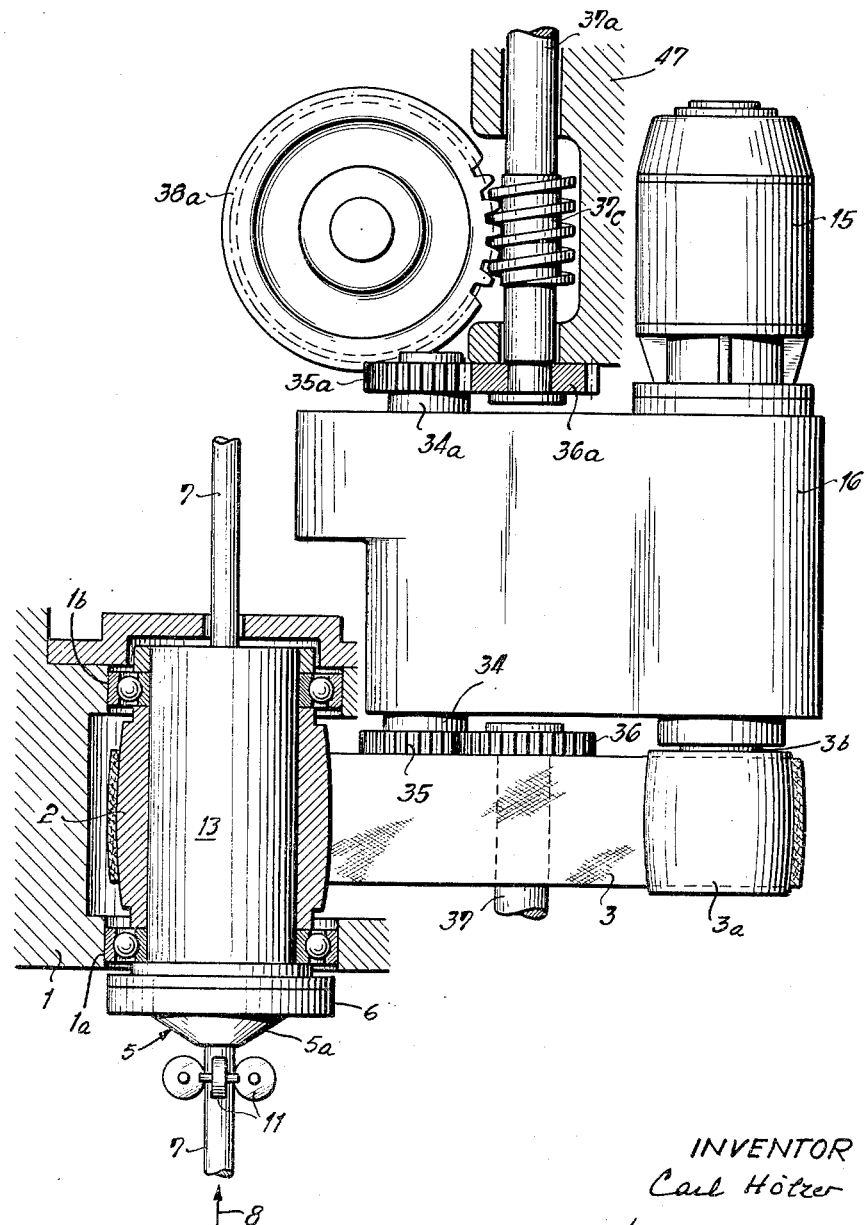

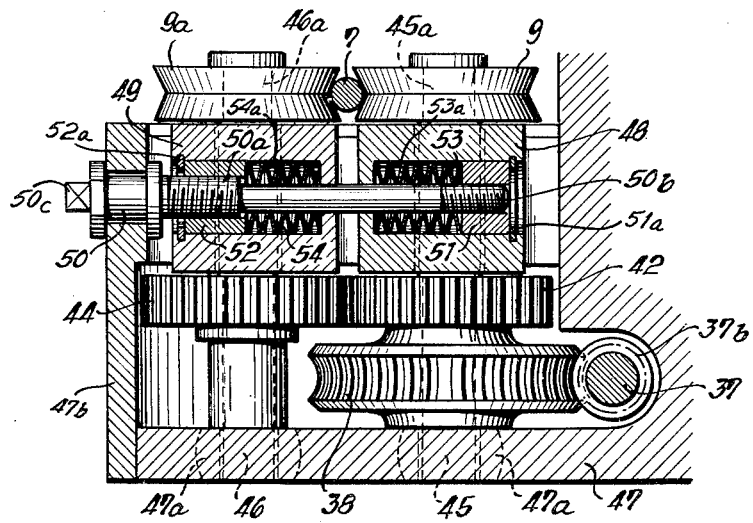
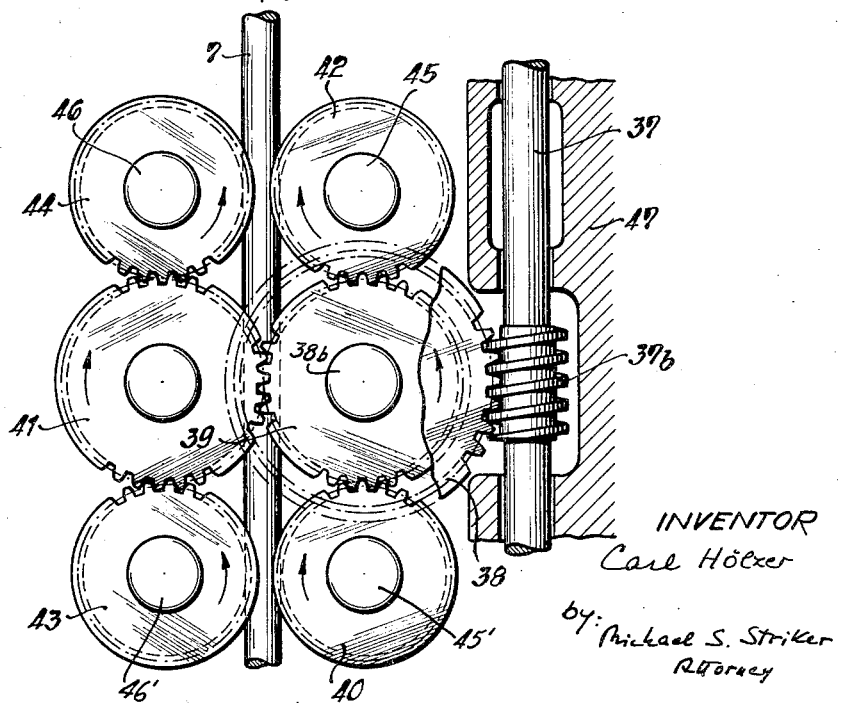

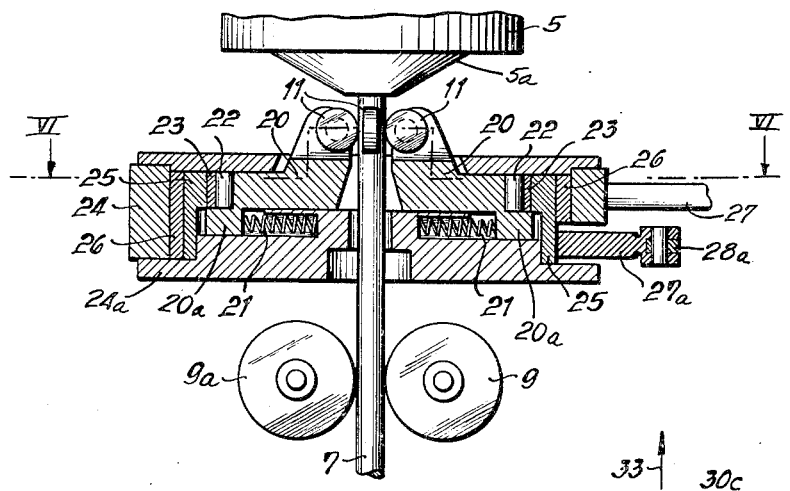
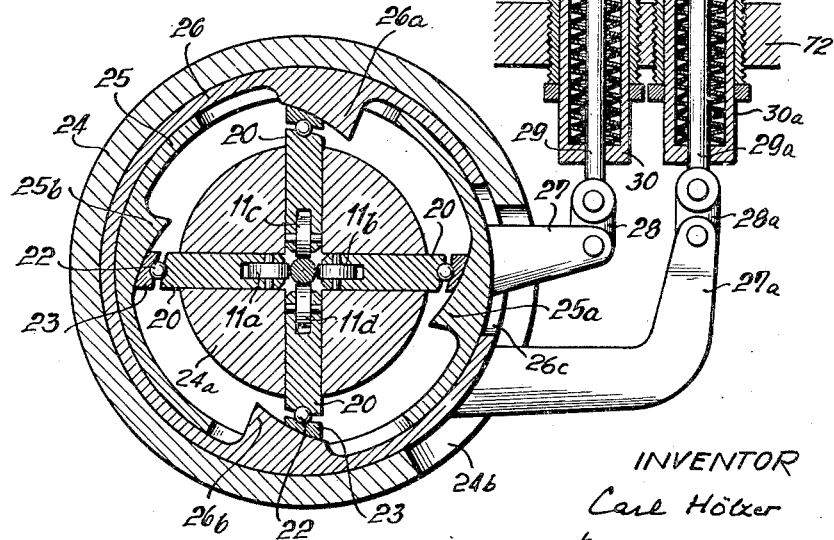

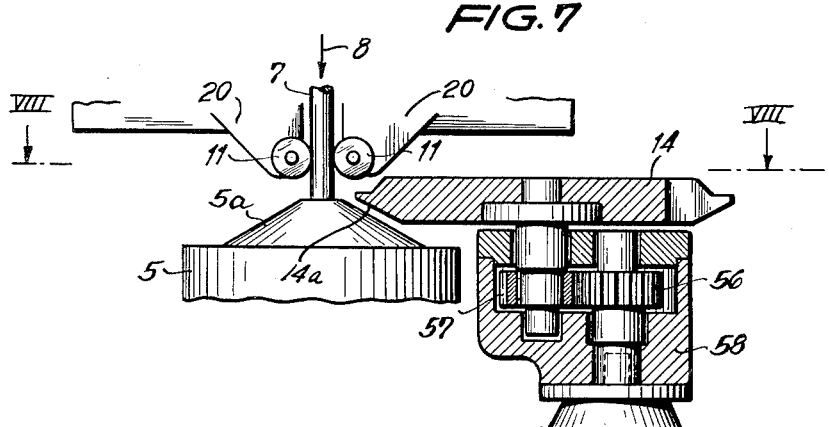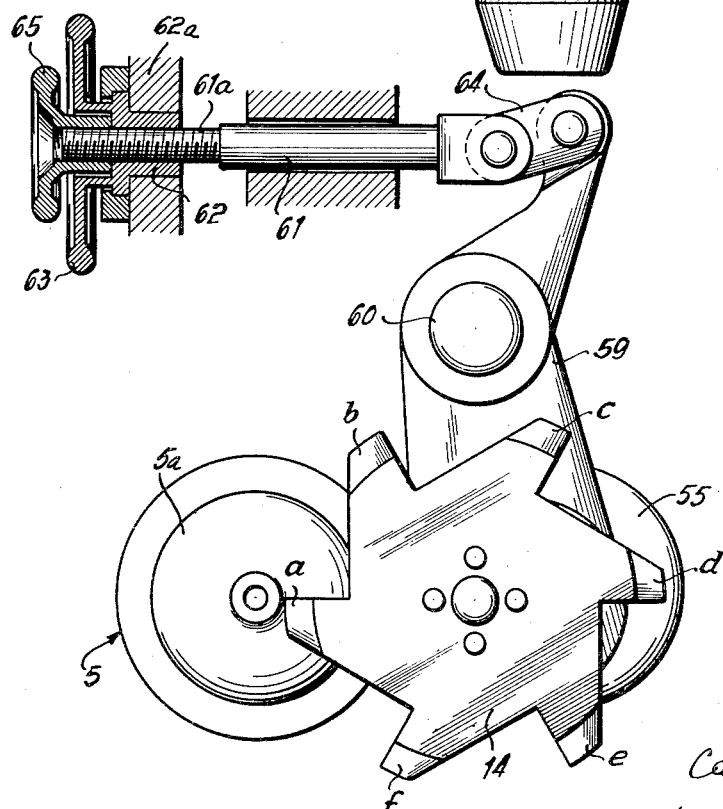

3,038,361
TURNING MACHINES
Carl Hölzer, Solingen, Germany, assignor to Firma Th. Kieserling & Albrecht, Solingen, Germany
Filed Nov. 4, 1958, Ser. No. 771,761
6 Claims. (Cl. 82—34)

The present invention relates to machine tools in general, and more particularly to improvements in machines used for turning of cylindrical workpieces.

As is known, turning is customarily performed in machine tools, such as engine lathes, and consists in shaping of stock into a piece having a circular outline at all cross-sections. It involves controlled cutting of the work by one or more tools which are brought to bear against it while it is revolved by a spindle or while the tools revolve about the axially advancing work. The present invention relates to the last mentioned types of machine tools in which the workpiece is advanced through a rotating tool holder.

An object of the invention is to provide a machine tool which is particularly suited for subjecting to turning workpieces or blanks of relatively small diameters in the range of ⅓ inch and less, and which is capable of turning very rapidly advancing workpieces.

Another object of the invention is to provide a turning machine in which the rapidly advancing work is held in such manner that no chatter marks remain when the turning operation is completed.

An additional object of the instant invention is to provide a machine of the characteristics above set forth which is so constructed that the work advancing and turning operations are not affected by the chips or shavings removed from the work.

A further object of the invention is to provide a machine tool which is so constructed that the chips removed from the work may be comminuted in immediate proximity of the turning tools.

A still further object of the present invention is to provide a turning machine in which the advancing workpiece is positively supported and guided immediately before and immediately after contact with the turning tools.

A yet further object of the invention is to provide improved means for rapidly advancing and positively guiding and supporting workpieces of different diameters.

A concomitant object of the invention is to provide a turning machine in which the holding means for turning tools and the work advancing means are driven by a single motor.

A yet further object of the invention is to provide a machine of the above described characteristics in which the turning tools are so installed as to provide sufficient room for discharge of chips or shavings removed from work during the turning operation.

A yet further object of the invention is to provide a turning machine in which the tool holding means may be rapidly and conveniently exchanged and in which the turning tools may be installed within or externally of the tool holding means without in either case interfering with the chip removing and comminuting action.

The above and certain other objects of the invention are attained by the provision of a machine in which the turning tools are connected with a conical extension of the hollow tool holder and in which the advancing workpiece is positively supported and guided immediately adjacent to and at both sides of the conical portion. One set of work guiding and supporting means in the form of suitably shaped radially disposed rollers is installed directly in the carrier or support for the tool holder and preferably extends into the latter's conical portion to be in immediate proximity of the turning tools where the advancing workpiece is subjected to greatest lateral stresses due to its contact with the tools. This arrangement also permits the positioning of chip reducing or comminuting means into immediate proximity of the turning tools. The tool holder is preferably connected with its angular motion imparting head or support by means of a quickly releasable coupling device, such as a bayonet ring or the like, which latter permits convenient interchange and replacement of turning tools together with the holder in which they are mounted.

That set of work supporting and guiding means which is received within the support or head for the turning tool holder is preferably mounted on spring biased levers articulately connected to a stationary carrier whereby its component parts are constantly urged into contact with the peripheral zones of advancing workpiece.

The chip reducing or comminuting means may assume the form of a star shaped cutter which, together with the drive means therefor, is pivotally mounted on a stationary shaft and, by means of suitable adjusting mechanism, may be pivoted about the shaft toward and away from the workpiece in close proximity of the conical portion in which the turning tools are mounted. The pivotally mounted chip or shaving reducing cutter may thus be adjusted into a series of different positions depending upon the diameter of advancing workpiece and, when pivoted away from the conical portion, permits convenient removal or interchange of the turning tool holder. Any accumulation of shavings between the chip reducing cutter and the tool holder is prevented because the turning tools are recessed into the outer surface of conical portion on the tool holder or are mounted in cutouts provided at the inner side of the conical portion. In either case, the outer surface of the conical portion is unobstructed and thus cannot cause accumulation of shavings thereabout.

That set of work supporting and guiding means which is mounted externally of the support for the tool holder is preferably installed on adjustable spring biased sliding members mounted in a suitable support through which the workpiece advances, and may be moved toward and away from the workpiece by cylinder-and-piston assemblies actuatable by springs, by a pneumatic or by a hydraulic pressure medium. The sliding members are guided by cam surfaces of relatively rotatable adjusting or cam rings which are articulately connected with respective pistons and cause the component parts of outer work supporting and guiding means to move toward or away from the workpiece whereby the guiding means may be used with workpieces or blanks of widely different diameters.

The work advancing means preferably comprise two spaced groups of radially arranged rollers driven by an electric motor which latter, over suitable reducing gears, at the same time rotates the carrier or head for the tool holder. The driving connection between reducing gears and work advancing means preferably comprises worm shafts, worm wheels and additional reducing gears which enable the work advancing means to cause axial movements of a workpiece at a given speed. In order to be capable of use with workpieces of different diameters, the work advancing means are preferably mounted on pivotable spring biased shafts combined with adjusting means for changing the pressure between the work advancing means and a workpiece on the one hand, and to permit movements of rollers constituting the work advancing means toward or away from each other when workpieces of different diameters are subjected to a turning operation.

Due to the adjustability of all work advancing and guiding means, and due to the adjustability of chip reducing means, the machine may accommodate workpieces of greatly different diameters especially since all work advancing and guiding means are preferably spring biased to maintain a requisite pressure upon the workpiece regardless of the latter's dimensions.

The novel features which are considered as characteristic for the invention are set forth in particular in the appended claims. The invention itself, however, both as to its construction and its method of operation, together with additional objects and advantages thereof, will be best understood from the following description of certain specific embodiments when read in connection with the accompanying drawings, in which:

FIG. 1 shows somewhat schematically the work advancing and supporting means in elevation, and the tool holding and chip reducing or comminuting means in partial section;

FIG. 2 is part sectional and part elevational view of the drive means for turning tools and for work advancing means;

FIG. 3 is part sectional and part elevational view of the work advancing means;

FIG. 4 illustrates, partly in section and partly in elevation, the adjusting device for work advancing means;

FIG. 5 is a section through the holders and adjusting device for the work supporting and guiding means;

FIG. 6 is a section taken substantially along line VI—VI of FIG. 5, as seen in the direction of arrows;

FIG. 7 is part sectional and part elevational view of the chip reducing means and of the driving apparatus therefor;

FIG. 8 is a plan view of chip reducing means and a partly sectional view of adjusting apparatus therefor substantially as seen from line VIII—VIII of FIG. 7 in the direction of arrows;

FIG. 9 is axial section through one form of tool holder with externally mounted turning tools;

FIG. 10 is fragmentary sectional view of the clamping means for turning tools as seen in the direction of arrows from line X—X in FIG. 11;

FIG. 11 is an end view of the structure shown in FIG. 9;

FIG. 12 is axial section through another form of tool holder with internally mounted turning tools;

FIG. 13 is fragmentary sectional view of the clamping means for turning tools as seen in the direction of arrows from line XIII—XIII in FIG. 14; and FIG. 14 is an end view of the structure shown in FIG. 12.

Referring now in greater detail to the drawings, and first to FIGS. 1 and 2, the tool and work supporting and work advancing means therein shown comprise a support or frame 1 receiving two antifriction bearings 1a, 1b rotatably mounting the turning head or pulley 2 of the machine. A bayonet ring 6 releasably connects a side of hollow head 2 with a holder 5 to which a number of turning tools or cutters 4 is connected in a manner to be described in greater detail in connection with FIGS. 9 to 11. Due to the provision of releasable coupling connection between members 2 and 5, a different set of turning tools may be inserted upon slight rotation of ring 6 into releasing position.

Head or pulley 2 is driven by a belt 3 which travels in an endless path over member 2 and over a second pulley 3a which latter is mounted on the shaft 3b driven by an electric motor 15. The speed of belt 3 is controllable by a reducing gearing installed in the gear box 16. An elongated workpiece 7 is advanced in the direction of arrow 8 by means of radially arranged rollers 9, 9a and 10, 10a disposed in advance and past the support 1, respectively, and passes through the bore 5b in conical portion 5a of tool holder 5 as well as through the hollow support 13 which latter may be an integral part of or is connected with member 1 by means of screw bolts 13a and extends into the bore of hollow head or pulley 2.

To prevent vibration of workpiece 7 due to its contact with rapidly rotating turning tools 4, the advancing workpiece is guided by a plurality of rollers 11 and 12 disposed in radial planes in advance and past members 4, respectively. Both sets of guiding or supporting rollers are closely adjacent to turning tools 4 and are resiliently mounted in a manner to be presently described.

Each supporting or guiding roller 12 is rotatably connected to one end of its respective lever or arm 17. The other ends of arms 17 are pivotally connected to bearing elements 18a by means of pivot axles or pins 18. Members 18a are installed in the axial bore of support 13 in radial planes passing through the axis of workpiece 7. Each arm 17 is biased by a spring 19 in such direction as to maintain guide rollers 12 in contact with the advancing workpiece or blank 7 as the latter enters from outside into the conical recess in tool holder 5. At least one pair of rollers 12 preferably extends into the conical recess in conical portion 5a of member 5.

As shown in FIGS. 5 and 6, guiding or supporting rollers 11 are mounted in ends of sliding members or holders 20 radially installed in a stationary circular support or housing 24a and, by means of coil springs 21 which act against flanges or shoulders 20a of members 20, are constantly urged radially outwardly away from the axis of workpiece 7 into firm contact with axially parallel bolts or roller bearing elements 22. Sliding members 20 are disposed in two diametral planes intersecting each other at right angles and intersecting the axis of head 2. Bolts 22 extend partly into recesses provided in end faces of sliding members 20 and partly into similar recesses defined by aligned sliding members 23 whose outer surfaces ride along the arcuate profiles of respective cams 25a, 25b and 26a, 26b forming part of cam rings 25, 26 respectively. Rings 25, 26 are mounted on an annular flange of housing or support 24a and are surrounded by a slotted annular member 24. Outer adjusting or cam ring 26 is connected with an angular lever 27a extending through the cutout or slot 24b in annular member 24. A second lever or arm 27 is connected with the inner adjusting or cam ring 25 and extends through a cutout 26c in ring 26 as well as through the aforementioned cutout 24b in annular member 24. The free ends of arms or levers 27, 27a are articulately connected to respective shackles 28, 28a which latter, in turn, are articulately connected to piston rods 29, 29a, respectively. Piston rods 29, 29a extend into cylinders 30, 30a, respectively, and carry respective pistons 32, 32a constantly biased in the direction of arrow 33 by springs 31, 31a, respectively. Any movement of piston rods 29, 29a and of their pistons 32, 32a in the direction of arrow 33 brings about movements of sliding members 20 toward the axis of circular housing 24a and thus moves guide rollers 11a–11d into contact with the periphery of workpiece 7. If no workpiece is received in stationary support or housing 24a, springs 31, 31a move respective pistons 32, 32a into abutment with cylinder end walls 30c, 30d, respectively. Cylinders 30, 30a are received in externally threaded sleeves 71, 71a meshing with an internally threaded stationary carrier or support 72. By rotating sleeves 71, 71a in stationary support 72, the axial position of cylinders 30, 30a and hence the radial position of supporting or guiding rollers 11a–11d may be changed in such a way that the rollers advance either toward or away from the axis of housing 24a. In this manner, the position of rollers 11a–11d may be adjusted depending upon the diameter of workpiece 7 and upon the desired extent of pressure to which the workpiece should be subjected by the guiding rollers.

Resilient means 31, 31a may be replaced by a hydraulic or pneumatic pressure medium supplied from a suitable source to bring about displacements of pistons 32, 32a in cylinders 30, 30a, respectively.

The mounting of, and drive means for, work advancing rollers 9, 9a and 10, 10a is illustrated in FIGS. 2, 3 and 4. Angular motion is derived from motor 15 over reducing gears in box 16. Pinion 35 on shaft 34, which latter is rotated at a selected and preferably adjustable speed by the gears in box 16, meshes with a pinion 36 on shaft 37, as is shown in FIG. 2. Referring now to FIG. 3, shaft 37 is formed with a worm 37b and is rotatably mounted in a stationary support, e.g. the side wall 47 adjacent to the bed of a machine frame in a machine tool, such as an engine lathe (not shown). Worm 37b meshes with worm wheel 38 which is mounted on shaft 38b coaxially with a spur wheel 39, the latter meshing with similar toothed wheels or gears 40, 41 and 42. Gear 41 meshes with gears 43 and 44 mounted on shafts 46′, 46, respectively. Shafts 45, 46 of gears 42, 44, respectively, support respective work advancing rollers 9, 9a. It will be noted in FIG. 3 that the system therein shown comprises driving gears for two additional work advancing rollers similar to members 9, 9a. Such additional rollers are not shown in FIG. 1; they may be mounted on shafts 45′, 46′ of gears 40, 43, respectively.

The drive for work advancing rollers 10, 10a located past the housing or frame 1, as seen in the direction in which the workpiece advances (arrow 8), i.e. at that side of head 2 which is turned away from tool holder 5, is identical with that shown in FIG. 3 and is illustrated only in part in FIG. 2. It comprises a shaft 34a deriving angular motion from the gears in box 16 and mounting a gear 35a which mates with gear 36a on worm shaft 37a also received in the side wall 47 of machine tool frame. Worm 37c on shaft 37a meshes with worm wheel 38a which latter, over suitable reducing gearing, analogous to elements 39–44 shown in FIG. 3, drives the shafts on which the work advancing rollers 10, 10a are mounted.

Referring now to FIG. 4, shafts 45, 46 of work advancing rollers 9, 9a, respectively, are received in adjustable spherical bearings 47a mounted in stationary support means, i.e. the side wall 47 of the machine tool frame. Bearings 47a permit movements of shafts 45, 46 toward and away from each other. Portions 45a, 46a of said shafts are received in bearing blocks 48, 49, respectively, which latter are axially slidable therealong. A feed rod or draw spindle 50 is formed with oppositely inclined sets of external threads 50a, 50b meshing with internal threads in distancing members or spacers 51, 52, respectively. Blocks 48, 49 are constantly urged toward each other by resilient elements 53, 54, respectively. Spring 53 is installed in a chamber or blind bore 53a in block 48 and, with its left-hand end, bears against the end wall of said chamber to urge member 48 in a direction to left, i.e. toward block 49. Spring 54 is similarly mounted in a chamber or blind bore 54a of bearing block 49. Distancing members or spacers 51, 52 are retained in bores 53a, 54a by split rings 51a, 52a, respectively. The action of springs 53, 54 generates pressure between work advancing rollers 9, 9a and the workpiece 7. As is shown in FIG. 4, rollers 9, 9a are mounted at the free ends of shaft portions 45a, 46a, respectively, and are disposed in a plane intersecting the axis of member 7.

Draw spindle 50 is rotatably mounted in plate 47b connected with member 47 and has a non-circular end 50c to facilitate the application thereto of a suitable tool by means of which it may be rotated to adjust the position of distancing means 51, 52 and hence the compression of springs 53, 54. In this manner, the pressure between rollers 9, 9a and workpiece 7 may be adjusted, if necessary, or the rollers may be brought into different positions and under different tensions requisite for reception of workpieces or blanks of different diameters. However, when the difference in diameters of successively treated workpieces exceeds a certain limit, rollers 9, 9a should preferably be replaced by work advancing rollers of different diameters.

The chip reducing or comminuting cutter or tool 14 is shown in greater detail in FIGS. 7 and 8. It is star shaped and comprises six arms formed with cutting edges a–f. As is best shown in FIG. 7, each of cutting edges a–f is formed with an inclined surface 14a whose inclination substantially equals that of the outer surface on conical portion 5a forming part of the turning tool holder 5. Thus, the chip reducing cutter 14 may be brought very close to the tool holder. It is driven by an electric motor 55 over reducing gears 56, 57 which are installed in gear box 58. Motor 55, gear box 58 and cutter 14 are mounted on a rocker arm 59 which is pivotable about a stationary axle or shaft 60. By swinging members 14, 55 and 58 together with rocker arm 59 about the shaft 60, an operator has free access to and may exchange or inspect the tool holder 5. Rocker arm 59 is articulately connected with a threaded spindle 61 whose externally threaded portion 61a is received in an internally threaded bushing 62. Bushing 62 is rotatably mounted in stationary member 62a and is connected to or integral with a handwheel 63. The articulate connection between spindle 61 and rocker arm 59 comprises a shackle 64. A second hand wheel 65 is screwed onto the free end of spindle port 61a. Rotation of the hand wheel 63 brings about swinging movements of rocker arm 59 and of chip reducing tool 14 about shaft 60 in a plane at right angles to the axis of head or pulley 2. The second hand wheel 65 permits resetting of cutter 14 onto its original position.

As before stated, turning tools 4 may be mounted in the outer or in the inner side of conical portion 5a on the tool holder 5. FIGS. 9 to 11 illustrate external and FIGS. 12 to 14 internal mounting of the tools. In either case, the cutting edges of tools 4 are so disposed as to provide sufficient room for discharge of cuttings or chips.

Referring to FIGS. 9 to 11, tools 4 are formed with wedge surfaces 4d engaging with complementary wedge surfaces of clamping members 66. The cutting edge of each tool extends into the bore 5b in conical portion 5a. Clamping members 66 are retained in cutouts 68 in the outer side of conical portion 5a of tool holder 5 by means of screw bolts 67. As shown, conical portion 5a has an outer conical surface which is turned away from that side of head 2 to which the tool holder 5 is connected. FIG. 11 illustrates three cutters 4a–4c though it will be understood that the number of turning tools may be higher or lower, if desired. It will be noted that only the cutting edges of tools 4a–4c extend into the bore 5b of conical portion 5a. The remaining portions of members 4a–4c as well as the clamping means 66 and bolts 67 are completely hidden in their respective recesses 68 so that no part projects beyond the outer surface of conical portion 5a.

The advantage of mounting cutters 4a–4c in the conical recess of conical portion 5a, as shown in FIGS. 12 to 14, is in that the exterior of part 5a is formed with a smooth and uninterrupted surface. Turning tools 4a–4c and clamping members 66 are mounted in internal cutouts 69 and retained therein by screw bolts 67. The smooth outer surface of part 5a prevents retention of chips and permits that the chip reducing tool 14 may be mounted immediately adjacent thereto, i.e. in the manner as shown in FIG. 7 in which the turning tools are hidden in conical part 5a.

The above described arrangement of tool holder 5, of driving means therefor, of the chip reducing means, as well as of work guiding, supporting and advancing means is one of great ruggedness and stability, safe in operation, and of much higher efficiency than the hitherto known apparatus for such purposes.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a machine for turning elongated workpieces, in combination: a hollow head having an axis and a side; means connected with said head for rotating same about said axis; a tool holder connected with said side and having a conical portion extending away from said side and defining a bore; at least one turning tool connected with said conical portion and having an edge extending into said bore; first work supporting roller means located along said axis outside of said head adjacent to said conical portion of said tool holder at the side thereof directed away from said head; second work supporting roller means located along said axis within said head, said first and second work supporting roller means engaging the work exclusively with rollers whose turning axes are perpendicular to said head axis; feed roller means for longitudinally feeding an elongated workpiece to said first work supporting roller means, through said bore into contact with said cutting tool and to said second work supporting roller means coaxially with said head, said workpiece being fed exclusively by said feed roller means; and chip cutting means for cutting chips developing on contact of the cutting edge of the turning tool with the workpiece, said last mentioned means comprising a cutter disposed intermediate said conical portion and said first work supporting roller means.

2. In a machine for turning elongated workpieces, in combination: a hollow head having an axis and a side; means connected with said head for rotating same about said axis; a tool holder connected with said side and having a conical portion extending away from said side and defining a bore; at least one turning tool connected with said conical portion and having an edge extending into said bore; first work supporting roller means located along said axis outside of said head adjacent to said conical portion of said tool holder at the side thereof directed away from said head; second work supporting roller means located along said axis within said head at the side of said tool holder opposite from said first work supporting roller means, said first and second work supporting roller means engaging the work exclusively with rollers whose turning axes are perpendicular to said head axis; feed roller means for longitudinally feeding an elongated workpiece to said first work supporting roller means, through said bore into contact with said cutting tool and to said second work supporting roller means coaxially with said head, said workpiece being fed exclusively by said feed roller means; and chip cutting means for cutting chips developing on contact of the cutting edge of the turning tool with the workpiece, said last mentioned means comprising a rotary cutter disposed intermediate said conical portion and said first work support roller means, a motor connected with said cutter for rotating same, a rocker arm having one end supportingly connected with said cutter and said motor and another end, a stationary shaft pivotally mounting said rocker arm, and means connected with the last mentioned end of said rocker arm for adjusting the latter's angular position about said shaft.

3. In a machine for turning elongated workpieces, in combination: a hollow head having an axis and a side; means connected with said head for rotating same; a tool holder connected to, and having a conical portion extending away from, said side and defining a bore; first work supporting roller means outside of and adjacent to said conical portion and comprising a stationary support, four sliding members in said support disposed in two diametrical planes intersecting each other at right angles along a line coincident with the axis of said head, each sliding member having a first end adjacent to said axis, a roller mounted on said first end and supported for rotation about an axis perpendicular to said head axis, and a second end distant from said axis, a pair of cam rings rotatably mounted on said support and each defining a pair of cam surfaces operatively connected with the second ends of said sliding members in respective diametral planes, resilient means for constantly urging the sliding members toward their respective cam surfaces, a cylinder for each cam ring, a piston in each cylinder articulately connected with the respective cam ring, means in said cylinders for constantly urging their respective pistons in such direction as to rotate the cam rings so as to move the sliding members and said rollers toward said axis, an externally threaded sleeve on each cylinder, and stationary means defining internally threaded bores meshing with said sleeves, the rotation of said sleeves bringing about changes in the position of said cylinders and of said sliding members; second work supportng roller means within said head; and work advancing feed roller means for feeding a workpiece coaxially with said head between the rollers of said first work supporting means, through said bore and toward said second work supporting means.

4. In a machine for turning elongated workpieces, in combination, a rotary frustoconical tool carrier rotatable about its axis and formed with an axial bore through which an elongated workpiece is adapted to move along said axis, said tool carrier having means for mounting a tool at the smaller end of the carrier with the cutting end of the tool located closely adjacent to said bore; guide roller means arranged along said axis at least one pair before and at least one pair after said smaller end of said tool carrier; a rotary chip cutter located closely adjacent to said rotary tool carrier and including a plurality of chip cutting portions; and feed roller means located along said axis and engaging a workpiece to feed the same along said axis, said feed roller means engaging the workpiece exclusively with feed rolls whose axes are respectively perpendicular to the axis of said rotary tool carrier.

5. In a machine for turning an elongated workpiece, in combination, a rotary frustoconical tool carrier supported for rotation about its axis and formed with an axial bore along which a workpiece is adapted to move, said tool carrier having one end smaller than the other and being adapted to carry a cutting tool adjacent said smaller end; a rotary chip cutter located closely adjacent to said rotary tool carrier at the exterior thereof and adjacent said smaller end thereof, said chip cutter including a plurality of peripheral cutting portions of relatively small thickness as compared to the remainder of said chip cutter; and work guiding roller means located outside of and closely adjacent to said tool carrier at said smaller end thereof, only said peripheral cutting portions of said chip cutter sweeping through the space between said roller means and said tool carrier so that said roller means can be located directly next to said tool carrier to support the work in the immediate vicinity of the cutting tool.

6. In a machine for turning elongated workpieces, in combination, a rotary tool carrier having a coaxial frustoconical end portion formed with an axial bore through which an elongated workpiece is adapted to move along the axis of said tool carrier, said tool carrier having means for mounting a tool at the smaller end of the carrier with the cutting end of the tool located closely adjacent to said bore; guide roller means arranged along said axis at least one pair before and at least one pair after said smaller end of said tool carrier respectively; chip cutter means located closely adjacent to said rotary tool carrier; and means located along said axis and engaging a workpiece to feed the same along said axis.

References Cited in the file of this patent

UNITED STATES PATENTS

| | | |
|---|---|---|
| 2,313,986 | Brown | Mar. 16, 1943 |
| 2,338,687 | Johnson | Jan. 4, 1944 |
| 2,547,529 | Lichtenberg | Apr. 3, 1951 |
| 2,586,929 | Tyson | Mar. 4, 1952 |
| 2,785,023 | Naumann | Mar. 12, 1957 |
| 2,845,827 | Brauer | Aug. 5, 1958 |

FOREIGN PATENTS

| | | |
|---|---|---|
| 566,478 | Great Britain | Jan. 1, 1945 |
| 927,062 | Germany | Apr. 28, 1955 |
| C9116!Ib/7d | Germany | Sept. 6, 1956 |